(12) United States Patent
Lin et al.

(10) Patent No.: US 8,491,245 B2
(45) Date of Patent: Jul. 23, 2013

(54) POSITIONING ASSEMBLY

(75) Inventors: Chun-Jen Lin, Taipei Hsien (TW); Mi-Chien Chen, Taipei Hsien (TW); Jin-Bao Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 390 days.

(21) Appl. No.: 12/893,194

(22) Filed: Sep. 29, 2010

(65) Prior Publication Data
US 2011/0217142 A1   Sep. 8, 2011

(30) Foreign Application Priority Data
Mar. 2, 2010   (CN) .......................... 2010 2 0121626

(51) Int. Cl.
*F16B 39/02* (2006.01)
(52) U.S. Cl.
USPC ............ 411/325; 418/378; 418/383; 418/395

(58) Field of Classification Search
USPC .............. 411/80.1, 80.5, 80.6, 325, 333, 336, 411/378, 381, 382, 383, 395, 403, 404
See application file for complete search history.

(56) References Cited

U.S. PATENT DOCUMENTS

| | | | | |
|---|---|---|---|---|
| 2,316,720 | A * | 4/1943 | Ramsey | 411/325 |
| 3,461,772 | A * | 8/1969 | Barry | 411/80.1 |
| 3,482,482 | A * | 12/1969 | Sage | 411/80.1 |
| 4,488,843 | A * | 12/1984 | Achille | 411/41 |
| 4,711,232 | A * | 12/1987 | Fischer et al. | 606/67 |
| 4,976,577 | A * | 12/1990 | Brown et al. | 411/271 |
| 5,169,400 | A * | 12/1992 | Muhling et al. | 606/304 |
| 5,333,977 | A * | 8/1994 | Sugawara | 411/271 |
| 6,488,459 | B2 * | 12/2002 | Carpenter | 411/325 |
| 6,679,661 | B2 * | 1/2004 | Huang | 411/29 |
| 6,902,567 | B2 * | 6/2005 | Del Medico | 606/71 |
| 6,908,271 | B2 * | 6/2005 | Breslin et al. | 411/271 |

\* cited by examiner

*Primary Examiner* — Roberta Delisle
(74) *Attorney, Agent, or Firm* — Altis Law Group, Inc.

(57) ABSTRACT

A positioning assembly includes a fastener and a pin. The fastener includes a latching portion and a fixing portion coaxially connected to the latching portion. The pin is movably received and fixed in the fastener. The fixing portion defines a threaded portion in a side surface of the fixing portion and a pinhole in an end surface of the fixing portion. The pin is received in the pinhole.

18 Claims, 2 Drawing Sheets

POSITIONING ASSEMBLY

BACKGROUND

1. Technical Field

The present disclosure relates to positioning assemblies, and particularly, to a positioning assembly having a fastener.

2. Description of the Related Art

Electronic devices such as flat panel TVs often defines a mounting hole in a rear face to enable wall mounting. When the electronic device is to be mounted, a threaded member is partially received in a threaded hole in the wall and also partially received in the mounting hole in the rear face. However, the threaded member is prone to detachment since the allowable length thereof is limited.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
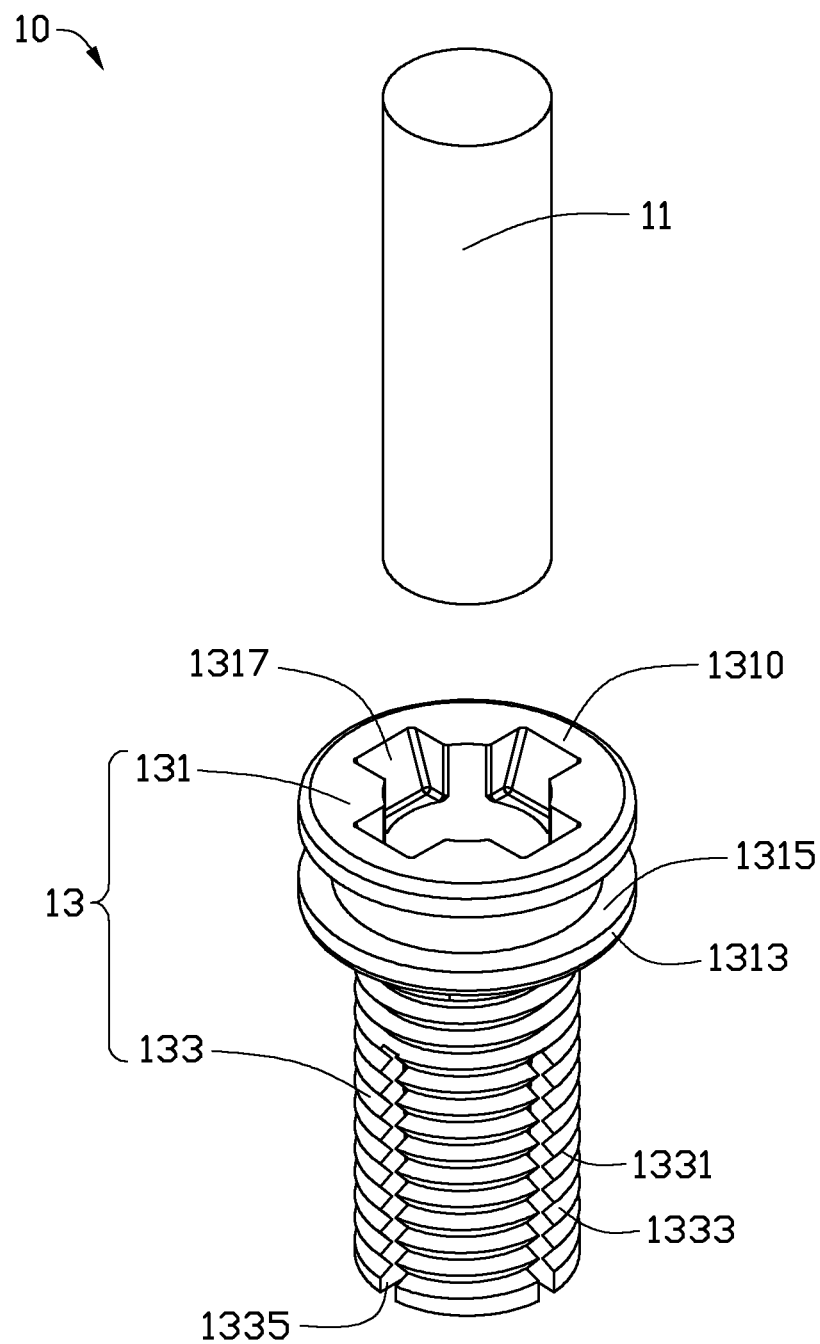
FIG. 1 is an exploded, isometric view of one embodiment of a positioning assembly including a fastener and a pin.
Figure 2:
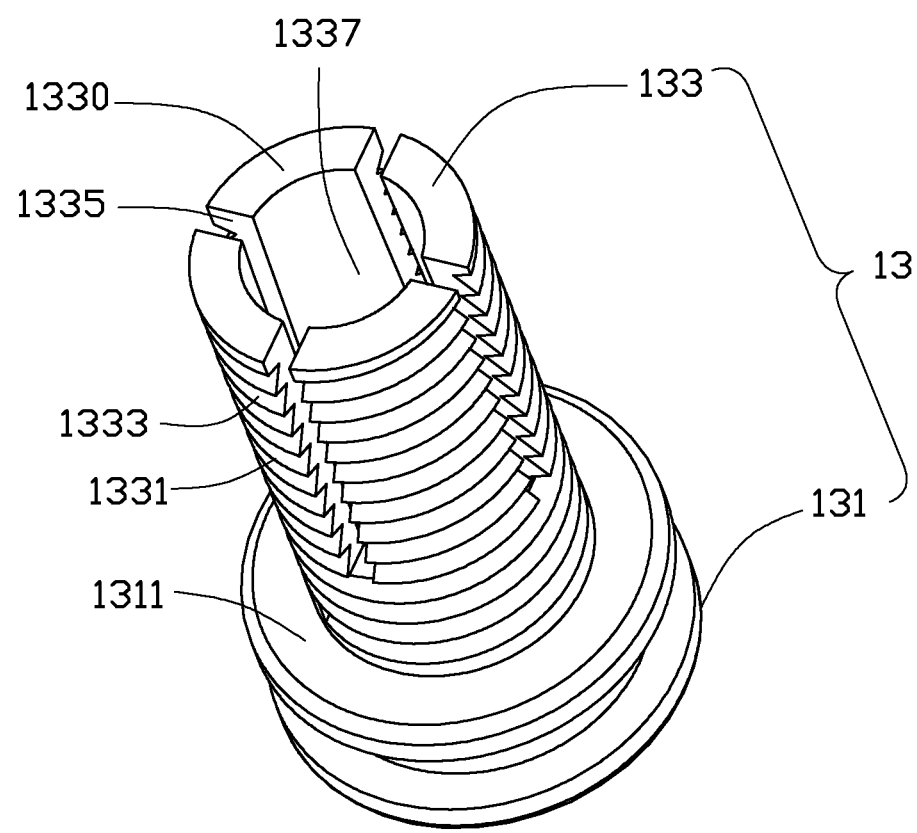
FIG. 2 is an isometric view of the fastener shown in FIG. 1.

Referring to FIGS. 1 and 2, one embodiment of a positioning assembly 10 includes a pin 11 and a fastener 13. The pin 11 is substantially cylindrical, and fixed on an electronic device (not shown) such as a flat panel TV. The fastener 13 is fixed in a threaded hole of a wall (not shown). The pin 11 is received in the fastener 13, such that wall mounting is thereby accomplished.

The fastener 13 includes a latching portion 131 and a fixing portion 133. The fixing portion 133 is coaxially connected to the latching portion 131.

The latching portion 131 is substantially cylindrical, and includes two end surfaces 1310, 1311 and a side surface 1313 connecting with the two end surfaces 1310, 1311. The latching portion 131 defines a latching groove 1315 in the side surface 1313 and a mounting groove 1317 on the end surface 1310. In the illustrated embodiment, the mounting groove 1317 is a substantially X-shaped depression. The latching groove 1315 is an annular depression.

The fixing portion 133 is substantially cylindrical, includes an end surface 1330 and a side surface 1331, and is coaxial to the latching portion 131. In the illustrated embodiment, a radius of the fixing portion 133 is less than that of the latching portion 131. The fixing portion 133 defines a threaded portion 1333 in the side surface 1331 and a pinhole 1337 in the end surface 1330. The pinhole 1337 extends along an axis of the fixing portion 133, and communicates with the mounting groove 1317 of the latching portion 131. In the illustrated embodiment, the pinhole 1337 is a cone-shaped hole. The fixing portion 133 further defines a plurality of slots 1335 in an outer surface of the fixing portion 133 communicating with the pinhole 1337. Each slot 1335 extends parallel to the axis of the fixing portion 133. In the illustrated embodiment, the slots 1335 are symmetrically opposite to each other.

During use of the positioning assembly 10, the fixing portion 133 of the fastener 13 is received in a threaded hole of a support member (not shown) such as a wall. The pin 11 is received in the pinhole 1337 of the fastener 13. The pin 11 resists the fixing portion 133 of the fastener 13, such that the fastener 13 is expanded by deformation of the fixing portion 133. The electronic device is fixed to the fastener 13 via the latching groove 1315, thus the electronic device is firmly fixed on the support member.

It is to be understood that the fixing portion 133 can also be polygonal, wherein the mounting groove 1317 of the latching portion 131 is correspondingly shaped. The latching groove 1315 of the latching portion 131 can also be of other shape such as arched.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A fastener comprising:
a latching portion and a fixing portion coaxially connecting the latching portion, wherein the fixing portion defines a threaded portion in a side surface of the fixing portion, the latching portion comprises two end surfaces and a side surface interconnecting the two end surfaces, and the latching portion defines a latching groove in the side surface of the latching portion located between the two end surfaces of the latching portion.

2. The fastener of claim 1, wherein the latching groove is an annular depression.

3. The fastener of claim 1, wherein the fixing portion further defines a pinhole extending along an axis of the fixing portion to receive a pin.

4. The fastener of claim 3, wherein the latching portion further defines a mounting groove in one of the two end surfaces of the latching portion away from the fixing portion communicating with the pinhole.

5. The fastener of claim 4, wherein the mounting groove is a substantially X-shaped depression.

6. The fastener of claim 4, wherein the pinhole is conical.

7. The fastener of claim 1, wherein the fixing portion further defines a plurality of slots in an outer surface of the fixing portion communicating with the pinhole.

8. The fastener of claim 7, wherein each slot extends parallel to the axis of the fixing portion.

9. The fastener of claim 7, wherein the slots are symmetrically opposite to each other.

10. A positioning assembly comprising:
a fastener comprising a latching portion and a fixing portion coaxially connected to the latching portion; and
a pin movably received and fixed in the fastener, wherein the latching portion comprises two end surfaces and a side surface interconnecting the two end surfaces of the latching portion, the latching portion defines a latching groove in the side surface of the latching portion located between the two end surfaces of the latching portion, the fixing portion defines a threaded portion in a side surface of the fixing portion and a pinhole in an end surface of the fixing portion, and the pin is received in the pinhole.

11. The positioning assembly of claim 10, wherein the latching groove is an annular depression.

12. The positioning assembly of claim 10, wherein the pinhole extends along an axis of the fixing portion to receive the pin.

13. The positioning assembly of claim 12, wherein the latching portion further defines a mounting groove in one of the two end surfaces of the latching portion away from the fixing portion communicating with the pinhole.

14. The positioning assembly of claim 13, wherein the mounting groove is a substantially X-shaped depression.

15. The positioning assembly of claim 13, wherein the pinhole is conical.

16. The positioning assembly of claim 10, wherein the fixing portion further defines a plurality of slots in an outer surface of the fixing portion communicating with the pinhole.

17. The positioning assembly of claim 16, wherein each slot extends parallel to the axis of the fixing portion.

18. The positioning assembly of claim 16, wherein the slots are symmetrically opposite to each other.

* * * * *